United States Patent [19]

Kogawa et al.

[11] 4,350,901

[45] Sep. 21, 1982

[54] CONTROL CIRCUIT FOR ELECTRONIC METER IN AN AUTOMOTIVE VEHICLE

[75] Inventors: Kouichi Kogawa; Teruo Kawasaki, both of Yokohama; Hiroyuki Nomura, Fujisawa, all of Japan

[73] Assignee: Nissan Motor Company, Limited, Yokohama, Japan

[21] Appl. No.: 188,856

[22] Filed: Sep. 19, 1980

[30] Foreign Application Priority Data

Sep. 25, 1979 [JP] Japan .............................. 54-121968

[51] Int. Cl.³ ............................................ B60K 35/00
[52] U.S. Cl. .................................. 307/10 R; 307/115
[58] Field of Search ............ 307/10 R, 10 LS, 10 BP, 307/113, 115

[56] References Cited

U.S. PATENT DOCUMENTS 2,913,590  9/1958  Todd .............................. 307/10 BP

OTHER PUBLICATIONS

"So wird's gemacht, Wartung und Instandhaltung des Passat und Passat-Variant" by H. R. Etzold, published in 1975.
"Elektronik" by Hans D. Fournell et al., published on Aug. 16, 1979.

Primary Examiner—L. T. Hix
Assistant Examiner—James L. Dwyer
Attorney, Agent, or Firm—Lane, Aitken, Kice & Kananen

[57] ABSTRACT

During starter motor operation, an electronic meter is not supplied with electric power so that the meter does not operate whereby fluctuating and flickering indications of the electronic meter are prevented. When other meters are illuminated, the electronic meter is also illuminated, thereby avoiding the incongruity that the electronic meter is dark whereas other meters are illuminated.

9 Claims, 2 Drawing Figures

CONTROL CIRCUIT FOR ELECTRONIC METER IN AN AUTOMOTIVE VEHICLE

BACKGROUND OF THE INVENTION

The present invention relates to an automotive vehicle electronic meter, and more particularly to a control circuit therefor.

Electronic meters used in automotive vehicles indicate, in bar form or by digital display, various information such as remaining fuel amount, cooling water temperature, hydraulic pressure, and battery voltage, and include fluorescent display tubes, liquid crystal displays.

Such information is commonly sensed as voltage signals dependent on the resistance values of various sensors. The battery voltage is directly sensed. These sensed voltage signals are subjected to processes such as analog to digital conversion and are then displayed.

When the vehicle is to be started, the load on the starter motor lowers the battery voltage. For instance, the output of a conventional 12-volt battery lowers to 5-8 volts when starting.

In an electronic meter such as mentioned above, the lowering of the battery voltage causes fluctuations in the sensed signal voltages, flickering displays and incorrect indications.

If the power supply for an electronic display meter is taken from an accessory terminal of an ignition switch, the meter indication will disappear and thus be free from incorrect display because the accessory terminal is not supplied with electric power when the ignition key is rotated to the starter position. Under these conditions, when the side marker lamps, tail lamps and so forth are lighted by turning on the light switch with the ignition key still in the off position, or with the key not inserted, illumination lamps for the meters within the instrument panel are also turned on, but the electronic meter remains off, displaying nothing, so that it appears odd among other lighted meters and presents an undesirable appearance thereby reducing the value of the vehicle. Therefore, it is desirable that the electronic meter should operate both when the light switch is turned on and when the accessory circuit is operated by the ignition switch. If, however, the electronic meter is operated whenever the light switch is turned on, the electronic meter will indicate a measured value during engine starting so that the meter indication will flicker or be incorrect.

SUMMARY OF THE INVENTION

The control circuit for an automotive vehicle electronic meter according to the present invention includes a cut off means which is operated by the ignition switch to cut off the power supply to the meter during operation of the starter motor wheteher or not the light switch is turned on. Thus, the meter indication disappears and therefore flickering and incorrect indication are prevented.

The electronic meter operates when the light switch is turned on to illuminate other meters, and also when the ignition switch is turned on to supply electric power to the ignition circuit or the accessory circuit. Thus, the incongruous failure of the electronic meter only to light-up is avoided, and the effectiveness of the control circuit is not impaired.

BRIEF DESCRIPTION OF THE DRAWINGS

The features and advantages of the control circuit according to the present invention will be more clearly appreciated from the following description taken in conjunction with the accompanying drawings in which like reference numerals designate corresponding elements, and in which.

DETAILED DESCRIPTION OF THE PREFERRED EMBODIMENTS

Figure 1:
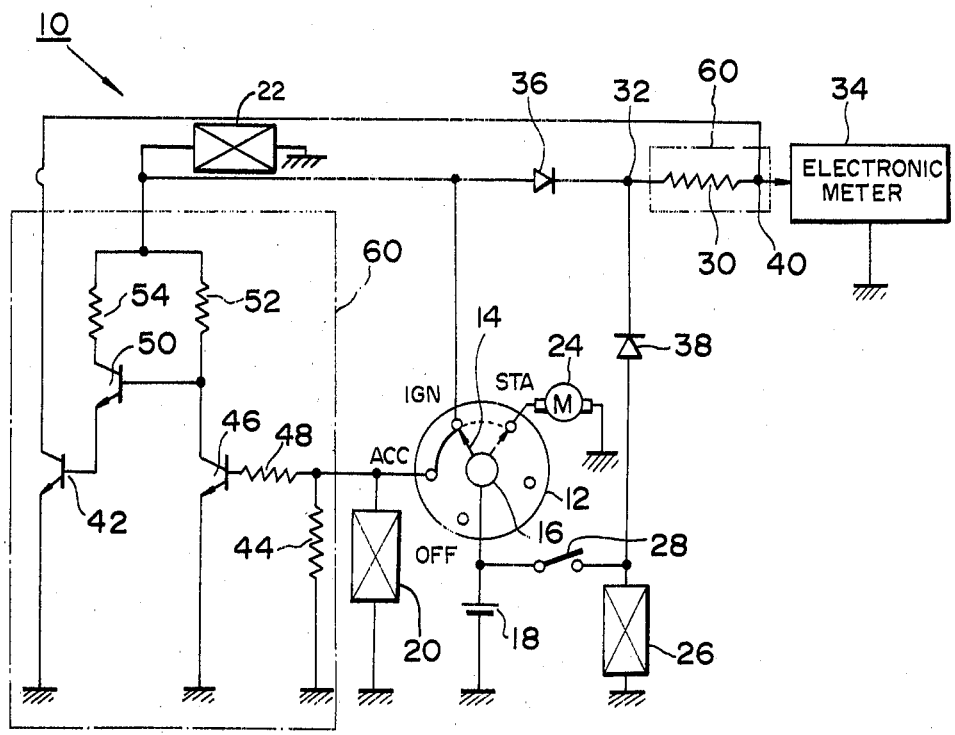
FIG. 1 is a schematic diagram of a preferred embodiment of the control circuit for an automotive vehicle electronic meter according to the present invention.

Referring to FIG. 1, there is shown a preferred embodiment of the control circuit of the present invention, generally designated by the reference numeral 10.

An ignition switch 12 is provided with a rotary contact arm 14 whose pivot 16 is connected to the positive electrode of a power supply 18 having its negative electrode grounded. The switch 12 further includes an OFF contact, an accessory contact ACC, an ignition contact IGN and a starter motor contact STA, any adjacent two of which may be contacted by the rotary contact arm 14. Accessories such as a radio receiver or stereophonic tape deck form a load 20 connected between the accessory contact ACC and ground. The ignition load such as an ignition coil 22 is connected between the ignition contact and ground, and a starter motor 24 is connected between the starter motor contact STA and ground. A lamp load 26 including a pair of side marker lamps and a pair of tail lamps is connected through a light switch 28 to the power supply 18. A resistor 30 connects a point 32 to an electronic meter 34 which includes a fluorescent display tube or a liquid crystal display. A reverse current preventive diode 36 connects the ignition contact IGN to the point 32, so that electric current flows only in the direction from the contact IGN to the point 32. A second reverse current preventive diode 38 connects the light switch 28 to the point 32 so that electric current flows only in the direction from the switch 28 to the point 32. Thus power may be supplied to the electronic meter 34 through either of the diodes 36 and 38.

The junction 40 between the resistor 30 and the meter 34 is connected to the collector of an NPN transistor 42 whose emitter is grounded.

A bias resistor 44 is connected in parallel with the accessories 20. An NPN transistor 46 has its base connected through a resistor 48 to the accessory contact ACC, its emitter grounded, and its collector connected to the base of an NPN transistor 50 and through a resistor 52 to the ignition contact IGN. The transistor 50 has its collector connected through a resistor 54 to the contact IGN and its emitter connected to the base of the transistor 42, thereby forming a current amplification circuit.

The resistor 30, the resistors 44 and 48, the transistors 46 and 50, the resistors 52 and 54, and the transistor 42 constitute a cut off circuit 60 which cuts off power to the meter 34.

Table I shows the relation between the position of the ignition switch contact arm 14, the voltage levels at the accessory and ignition contacts ACC and IGN, the state of the light switch 28, and whether the meter 34 is operated.

TABLE I

| Ignition Switch position | Terminal Voltages ACC | Terminal Voltages IGN | Electronic Meter Light switch off | Electronic Meter Light switch on |
|---|---|---|---|---|
| OFF | Low | Low | Off | On |
| ACC | High | Low | Off | On |
| IGN | High | High | On | On |
| STA | Low | High | Off | Off |

Referring to FIG. 1 and Table I, the operation of this embodiment of the invention is now described.

(1) When the ignition switch is in the OFF position, including the time when the key is removed:

The rotary contact arm 14 of the ignition switch 12 is at the contact OFF, and the contacts ACC and IGN are not supplied with power from the battery 18, so that they are held at ground voltage (low) through the load 20 and 22, respectively. Thus the electronic meter 34 is not supplied with electric current through the diode 36, so that the meter 34 is off when the light switch 28 is off. If the light switch 28 is turned on, power will be supplied from the battery 18 to the meter 34, turning the meter on.

(2) When the ignition switch is in the ACC position:

The rotary contact arm 14 of the ignition switch 12 contacts the contact ACC supplying the contact ACC with the battery voltage, thereby supplying power to the accessory 20. The contact IGN, however, remains at ground voltage level. Thus, when the light switch 28 is turned on, the meter 34 is on and when the light switch 28 is turred off, the meter 34 is off as in the case (1).

(3) When the ignition switch is in the IGN position:

The rotary contact arm 14 of the ignition switch 12 contacts the contacts IGN and ACC, as shown in a solid line, so that the contacts IGN and ACC are at the battery voltage level. Therefore, the transistor 46 is turned on so that the collector potential of the transistor 46 and therefore the base potential of the transistor 50 are at the ground voltage level, thereby maintaining the transistor 42 off. The electronic meter 34 is then supplied with electric power from the battery 18 through the contact IGN so that the meter 34 is on, irrespective of whether the light switch 28 is on or off.

(4) When the ignition switch is in the starter motor STA position:

The rotary contact arm 14 of the ignition switch 12 contacts the contacts STA and IGN, as shown in a broken line so that the contacts STA and IGN are at the battery voltage level, thereby rotating the starter motor 24 and starting the engine.

On the other hand, the contact ACC is at the ground voltage level so that the transistor 48 is off. Thus, the transistor 50 and therefore the transistor 42 are turnd on, so that the potential at the point 40 is at the ground voltage level. As a result, electric power to the meter 34 is cut off, and therefore the meter 34 is turned off irrespective of whether the light switch 28 is on or off.

Figure 2:
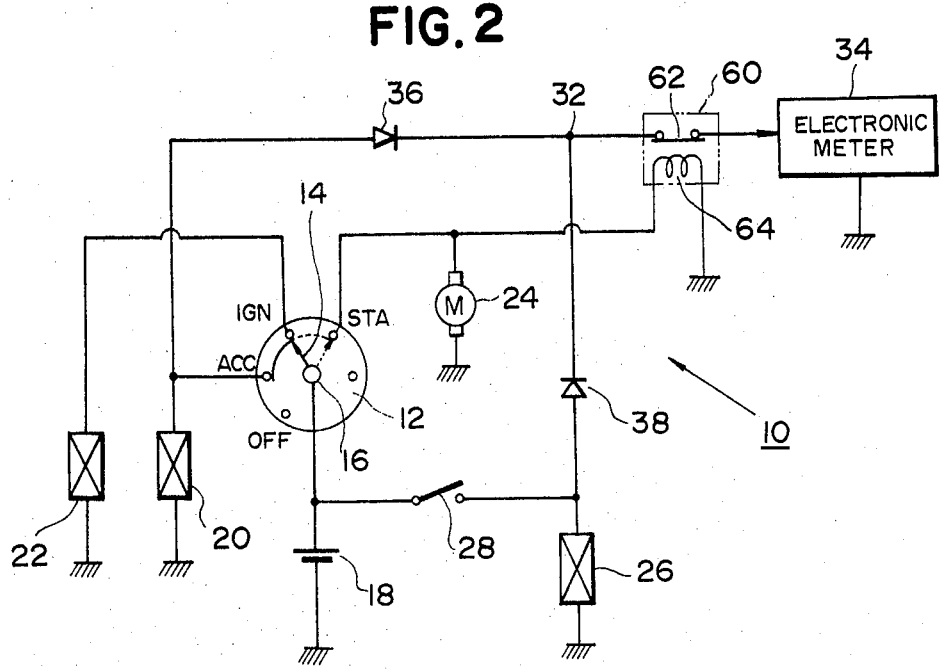
FIG. 2 is a schematic diagram of an alternative embodiment of the present invention.

Referring to FIG. 2, there is shown a second embodiment of the invention. This embodiment operates in such a manner that the electric meter 34 is operated when either the light switch 28 is turned on or the contact ACC is contacted by the rotary contact arm 14. This embodiment is the same as the embodiment of FIG. 1, except that in place of the contact IGN, the contact ACC is connected to the diode 36, and that in place of the cut off circuit 60 of FIG. 1, the cut off circuit 60 of FIG. 2 includes a relay 60 which has a pair of normally closed contacts 62 connecting the point 32 to the meter 34, and a coil 64 connected between the contact STA and ground.

Table II for the FIG. 2 embodiment corresponds to Table I for the FIG. 1 embodiment.

TABLE II

| Ignition Switch position | Terminal Voltages ACC | Terminal Voltages IGN | Electronic Meter Light switch off | Electronic Meter Light switch on |
|---|---|---|---|---|
| OFF | Low | Low | Off | On |
| ACC | High | Low | On | On |
| IGN | High | High | On | On |
| STA | Low | High | Off | Off |

In this embodiment, when the ignition switch is in the starter motor position STA, the relay coil 64 is supplied with electric current from the contact STA of the igntion switch 12 so that the normally closed contacts 62 of the relay 60 are opened thereby cutting off the circuit from the contact ACC to the meter 34. Thus, when the starter motor 24 is operated to start the engine, the meter 34 is turned off irrespective of whether the light switch 28 is on or off, as in the first embodiment. On the other hand, when the ignition switch is in the accessory position ACC to supply current to the accessory load 20, the meter 34 is turned on even when the light switch 28 is off, in contradistinction to the embodiment of FIG. 1.

Fixed indications such as the scale, symbol marks, units, etc., in the meter may be kept on during starting of the engine.

Thus a display control circuit for an automotive vehicle electronic meter in accordance with the present invention satisfies all of the aims and objectives set forth above. It should be understood that further modifications and variations may be made in the present invention as described hereinabove without departing from the spirit of the present invention as set forth in the appended claims. It will be seen for example that the first embodiment described herein operates by detecting a potential difference between two circuits, viz. the accessory and ignition circuits, but that the roles of these two circuits may be interchanged if for example the power to the electronic meter through the diode 36 is taken from the accessory terminal ACC rather than the ignition terminal IGN, as may be desirable in certain circumstances.

What is claimed is:

1. A control circuit for an automotive vehicle electronic meter, comprising:
   (a) first switching means for selectively supplying power to a first supply circuit;
   (b) second switching means for selectively supplying power to a starter motor circuit;
   (c) first supply means connected to said first switching means;
   (d) cut off means connected to the first switching means and supplying to said meter power supplied independently by the first switching means, but adapted to cut off power from said first supply means when the second switching means supplied power to the starter motor circuit, said cut off means including a resistor connected between said electronic meter and the output of said first supply means; and
   (e) means for grounding the junction between said meter and said resistor whenever said second switching means supplies power to said starter motor circuit.

2. The control circuit of claim 1 in which the first supply means comprises a first diode disposed so that power can flow from said first switching means to said cut off means.

3. The control circuit of claim 2, further comprising third switching means for selectively supplying power to a second supply circuit, and in which the first, second and third switching means are electrically actuable sequentially by a single switch.

4. The control circuit of claim 3 in which the first switching means is an ignition contact of an ignition switch, the first supply circuit is an ignition circuit, the second switching means is a starter contact of said ignition switch, the third switching means is an accessory contact of said ignition switch, and when said starter contact is closed, said ignition contact is closed and said accessory contact is open.

5. The control circuit of claim 3, wherein said grounding means includes a first transistor for grounding said junction between said meter and said resistor when said first transistor is turned on.

6. The control circuit of claim 5 wherein said grounding means includes a second transistor turned on when said third switching means supplies power to said second supply circuit and a third transistor connected to the second transistor so that when the second transistor is on, the third transistor is off, said third transistor being further connected to the first switching means and said first transistor so that, provided the second transistor is off, when the first switching means supplies power to the first supply circuit the third transistor and therefore the first transistor are on.

7. A control circuit for an automotive vehicle electronic meter, comprising:
(a) first switching means for selectively supplying power to a first supply circuit;
(b) second switching means for selectively supplying power to a starter motor circuit;
(c) first supply means connected to said first switching means;
(d) second supply means connected to a lighting circuit; and
(e) cut off means connected to the first switching means and supplying to said meter power supplied by the first switching means, but adapted to cut off power from the first supply means when the second switching means supplies power to the starter motor circuit;
(f) the first supply means comprising a first diode disposed so that power can flow from said first switching means to said cut off means;
(g) the cut off means being a relay, a coil of which is connected between the second switching means and ground, and a pair of normally closed contacts connected between the output of the first supply means and the meter; and
(h) the first switching means being an accessory contact of an ignition switch and said first supply circuit being an accessory circuit.

8. The control circuit of claim 7, further including:
(a) third switching means for selectively supplying power to a lighting circuit;
(b) second supply means connected between the third switching means and the junction of said cut off means and the first supply means; and
the first and second switching means being electronically actuable sequentially by a single switch.

9. The control circuit of claim 7, further including:
(a) third switching means selectively supplying power to a lighting circuit; and
(b) second supply means including a diode connected between the third switching means and the junction of the cut off means and the first supply means.

* * * * *